United States Patent [19]
Wilson

[11] 3,984,118
[45] Oct. 5, 1976

[54] CARGO SECURITY SYSTEM

[75] Inventor: James D. Wilson, Newport Beach, Calif.

[73] Assignee: Banner Metals Division Intercole Automation, Inc., Compton, Calif.

[22] Filed: June 9, 1975

[21] Appl. No.: 585,035

[52] U.S. Cl. .......................... 280/179 B; 105/502; 105/504; 296/24 R
[51] Int. Cl.[2] ........................................... B60P 7/08
[58] Field of Search ............. 296/24 R, 24 A, 24 B, 296/24 C, 28 M; 280/179 R, 179 B; 105/497, 498, 502, 503, 504; 248/119, 246, 500, 507; 211/105.1, 105.2

[56] References Cited
UNITED STATES PATENTS

| | | | |
|---|---|---|---|
| 2,340,374 | 2/1944 | George | 296/24 R X |
| 2,546,929 | 3/1951 | Nampa | 296/24 R |
| 2,626,165 | 1/1953 | Snyder | 280/179 B |
| 2,727,711 | 12/1955 | Bally | 248/246 |
| 2,873,694 | 2/1959 | Jaskowiak | 280/179 R X |
| 2,963,992 | 12/1960 | Schroeder | 105/503 |
| 3,173,708 | 3/1965 | Machielse | 280/179 R |
| 3,282,548 | 11/1966 | Ruhnke | 211/105.1 X |
| 3,624,736 | 11/1971 | Iwami | 248/119 R X |
| 3,730,468 | 5/1973 | Magnusen | 248/246 |
| 3,907,117 | 9/1975 | Williams | 280/179 R X |

Primary Examiner—Frank E. Werner
Assistant Examiner—Winston H. Douglas
Attorney, Agent, or Firm—Keith D. Beecher

[57] ABSTRACT

A cargo security system is provided which can easily be mounted in delivery trucks of a wide variety of sizes, and which provides a positive means for preventing the load in the trucks from sliding, especially when the load comprises stacks of receptacles supported on wheeled dollies. The security system of the invention comprises a plurality of upright support posts which are mounted on the deck of the truck and which are attached to the underside of the top of the truck along a fore and aft axis displaced from one of the side walls of the truck. A similar security system may be mounted on the truck adjacent the opposite side wall thereof. A retainer in the form of a U-shaped slide bar is slidably mounted across each pair of the upright posts, and the bar is movable vertically to an upper position to permit a dolly loaded with a stack of receptacles to be wheeled between the corresponding pair of posts against the side wall, and down to a closed position in which the loaded dolly is securely retained by the bar against the side wall. A further upright post is movable in the central aisle to predetermined fixed positions to retain further loaded dollies in the central aisle.

2 Claims, 2 Drawing Figures

U.S. Patent  Oct. 5, 1976  3,984,118
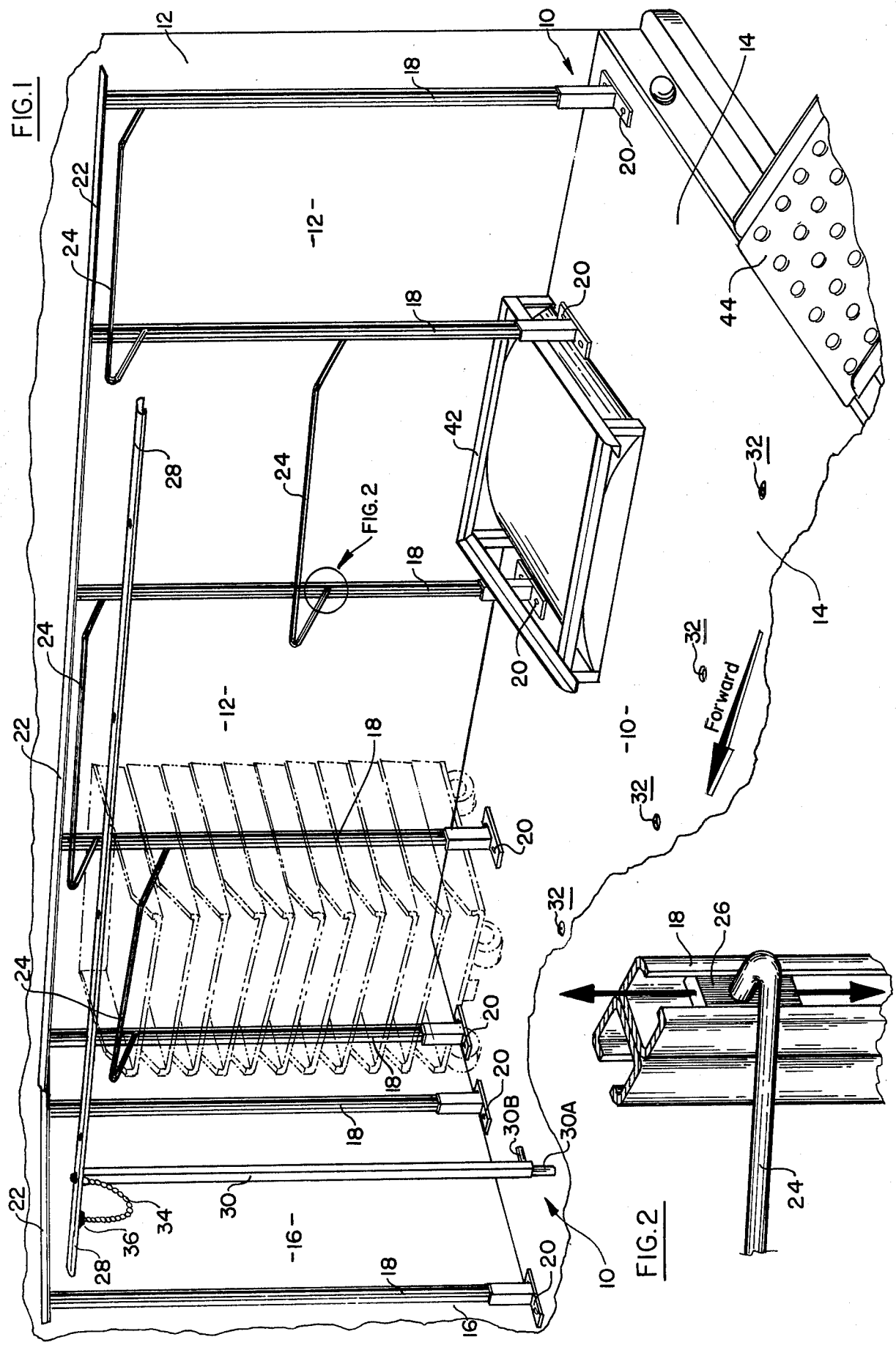

CARGO SECURITY SYSTEM

RELATED COPENDING APPLICATION

Ser. No. 545,115, — Tryon — filed Jan. 29, 1975, now abandoned.

BACKGROUND OF THE INVENTION

It is usual in many industries to transport goods in stacks of receptacles, the stacks being loaded on wheeled dollies. The loaded dollies are usually transported from the factory, for example, to warehouses or retail outlets, on trucks. It is important, in order to facilitate the distribution of the goods, that the loaded dollies be freely movable onto the trucks at the factory, and that the loaded dollies be freely movable off the trucks at the warehouse or retail centers. It is also most important that the loaded dollies be firmly and securely retained in place on the trucks as they are being transported from one location to another, and that this be achieved by appropriate means which does not entail excessive extraneous operations in order to secure the loaded dollies in the trucks, and subsequently to release the loaded dollies when the destinations are reached.

A security system is described in the copending application Ser. No. 545,115 which is eminently suited for the purpose described in the preceding paragraph. The system described in the copending application comprises a series of gates which are mounted on upright posts adjacent the two side walls of the truck. A central aisle is provided between the gates to permit the dollies to be wheeled onto the truck and into positions along the side wall in which they are securely retained by the gates until the destination is reached. Then, the gates may be opened, and the dollies may be conveniently, individually wheeled off the truck.

The security system of the present invention is of the general type as the one described in the copending application. In the system of the present invention, the gates are in the form of U-shaped slide bars which may be conveniently moved upwardly along channels in corresponding pairs of the upright posts to positions in which they permit the dolly to be moved between the posts and tack against the side walls of the truck. The slide bar gates may then be moved down the channels to closed and locked positions in which they engage the receptacles loaded on the various dollies between the corresponding pairs of posts, so as to retain the loaded dollies firmly and securely against the side walls of the truck. When a destination is reached, the individual slide bars are moved upwardly to their open positions, so that the loaded dollies may be easily and readily be individually removed from the truck along the central aisle.

BRIEF DESCRIPTION OF THE DRAWINGS

FIG. 1 is a perspective fragmentary representation of the security system of the invention, in one of its embodiments, showing a series of slide bar gates disposed along a fore and aft axis of a truck adjacent to one of its side walls; it being understood that a similar series of slide bar gates may be disposed on the other side of the truck and adjacent to its other side wall, leaving a central access aisle between the gates; and FIG. 2 is a detailed perspective representation of a sliding locking slug which is affixed to the ends of each slide bar gate, and which may be moved along channels formed in the individual posts when the corresponding slide bar gate is manually turned to place its slugs in uncocked positions with respect to the channels.

DETAILED DESCRIPTION OF THE ILLUSTRATED EMBODIMENT

The cargo security system, as shown in the drawings, comprises a series of upright posts 18, five of which are shown as disposed along a fore and aft axis of the truck 10 on one side of its central fore and aft axis, displaced from a side wall 12 of the truck, and two of which are shown as placed djacent the end wall 16 of the truck. The posts 18 are secured to the deck 14 of the truck by means of a series of brackets 20 which are screwed or bolted to the deck. The posts 18 may be extensible to fit various truck sizes, and they may be secured to the underside of the top of the truck by appropriate elongated brackets 20 which, likewise, may be screwed or bolted to the top.

Each of the posts 18 has an elongated channel extending along one of its sides, and a plurality of U-shaped slide bars 24 have slugs 26 attached to their ends which are received in the respective channels, as shown in FIG. 2. Each U-shaped slide bar normally turns downwardly under the force of gravity to turn its corresponding slugs 26 to cocked positions in the respective channels in upright posts 18, so as to prevent movement thereof in the channels. However, when a slide bar 24 is turned manually upwardly, its slugs 26 may be uncocked, and the slide bar may be slidable upwardly and downwardly.

As shown in FIG. 1, for example, the slide bar 24 to the extreme right of the drawing has been moved to its upper position and locked against the top of the truck out of the way, so as to permit a dolly and a stack of receptacles to be moved between the corresponding posts 18 and against the side wall. The slide bar 24 may then be turned upwardly to release its slugs 26, and moved downwardly until it locks against the forward edge of the uppermost receptacle in the stack, as shown by the extreme left-hand slide bar 24 in FIG. 1. In that position, the slide bar securely holds the loaded dolly in place against the side wall 12.

An adapter bracket 42 is also provided, and it is mounted over the wheel well of the truck, so as to provide a firm retaining means against fore and aft movement, for a stack of receptacles loaded thereon from a corresponding dolly, and held securely in place by the corresponding slide bar 24.

A further horizontal slide bar 28 is provided along the ceiling of the truck, and an upright post 30 is movable along the bar 28 to different positions determined by holes 32 in the deck which receive a spring-loaded plunger 30A at the lower end of the post 30, the plunger being released by means of a handle 30B. Removal of the plunger from the channel 28 is prevented by means of a spring 34 attached to the upper end of the plunger and to a slide 36 in the channel 28.

After the loaded dollies have been positioned along each side wall of the truck in the manner described, further dollies can be positioned along the central aisle, and held in place by the upright post 30, as it is moved from one hole 32 to the other.

An appropriate ramp 44 is provided at the rear end of the truck for loading the dollies on to and off of the truck.

The invention provides, therefore, an improved and simplified cargo security system which can be fitted into a wide variety of truck types and sizes, and which provides a simple and expeditious means for securely holding loads in place in the truck while the truck is in motion, and yet which permits easy access to the loads for loading and unloading purposes.

While a particular embodiment of the invention has been shown and described, modifications may be made. It is intended in the claims to cover the modifications of the invention which come within the spirit and scope of the invention.

What is claimed is:

1. A cargo security system for a delivery truck, or the like, the truck having side walls and a deck, said security system comprising: a plurality of post members each mounted in an upright position on the deck and located along an axis spaced from and parallel to one of the side walls; a corresponding plurality of U-shaped slide bars mounted on respective pairs of the posts and individually movable therealong between an upper open position to permit a load to be moved against the corresponding side wall, and a lower closed position in which the slide bars retain the loads against the last-named side walls; and a plurality of locking means respectively mounted on the slide bars and slidable along the posts to secure the slide bars in their open and in their closed positions, each of said locking means being in the form of a slug affixed to each end of each of said slide bars, and each of said slide bars normally turning downwardly under the force of gravity thereby tending to turn its corresponding slugs to a cocked and locked position with respect to the corresponding posts, and each of said posts defining a channel to receive the corresponding slug such that when the slide bar is turned manually upwardly the slug is permitted to slide therein in an uncocked position and when the slide bar is released the slug is locked relative thereto in a cocked position.

2. The cargo security system defined in claim 1, and which includes a further upright bar movable to predetermined fixed positions along a central aisle in the truck to retain further loads in the central aisle.

* * * * *